J. P. DE ROSE.
GEARLESS MOWER.
APPLICATION FILED DEC. 4, 1909.

996,622.

Patented July 4, 1911.

3 SHEETS—SHEET 1.

Witnesses
Ernest Crocker
L. V. Gillis

Inventor
John Paul De Rose.

By
Attorneys

J. P. DE ROSE.
GEARLESS MOWER.
APPLICATION FILED DEC. 4, 1909.

996,622.

Patented July 4, 1911.

3 SHEETS—SHEET 2.

Inventor
John Paul De Rose.

Witnesses
Ernest Crocker
L. N. Gillis

By
Attorneys

J. P. DE ROSE.
GEARLESS MOWER.
APPLICATION FILED DEC. 4, 1909.
996,622.
Patented July 4, 1911.
3 SHEETS—SHEET 3.
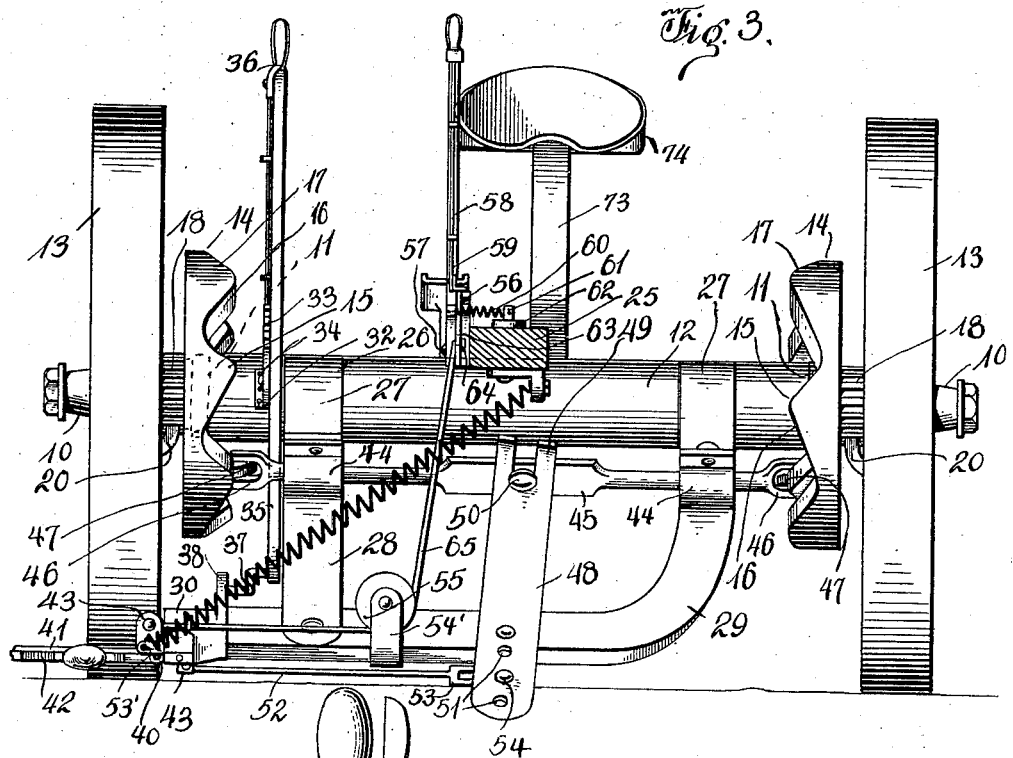
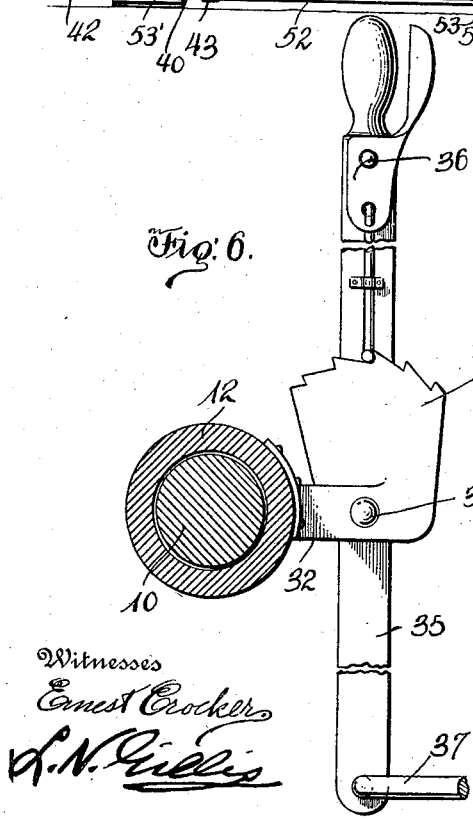
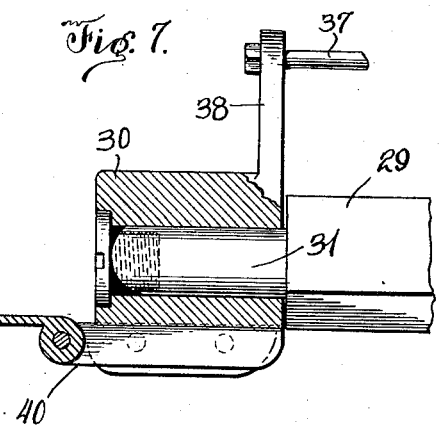
Witnesses
Ernest Crocker
L. N. Gillis
Inventor
John Paul DeRose.
By
Attorneys

UNITED STATES PATENT OFFICE.

JOHN PAUL DE ROSE, OF LA CRESCENT, MINNESOTA.

GEARLESS MOWER.

996,622.　　　　　Specification of Letters Patent.　　Patented July 4, 1911.

Application filed December 4, 1909. Serial No. 531,342.

*To all whom it may concern:*

Be it known that I, JOHN PAUL DE ROSE, a citizen of the United States, residing at La Crescent, in the county of Houston, State of Minnesota, have invented certain new and useful Improvements in Gearless Mowers; and I do hereby declare the following to be a full, clear, and exact description of the invention, such as will enable others skilled in the art to which it appertains to make and use the same.

This invention relates to agricultural implements and has special reference to a novel form of mowing machine which is preferably termed a gearless mower, as the same has no spur, bevel, sprocket or other gear wheel.

One object of the invention is to improve and simplify the general construction of devices of this character.

A second object of the invention is to provide an improved arrangement for working the knife bar on a machine of this character.

With the above and other objects in view the invention consists in general of a wheel supported frame provided with direct acting means for actuating a knife bar.

The invention further consists in certain novel details of construction and combinations of parts hereinafter fully described, illustrated in the accompanying drawings, and specifically set forth in the claims.

Figure 1:
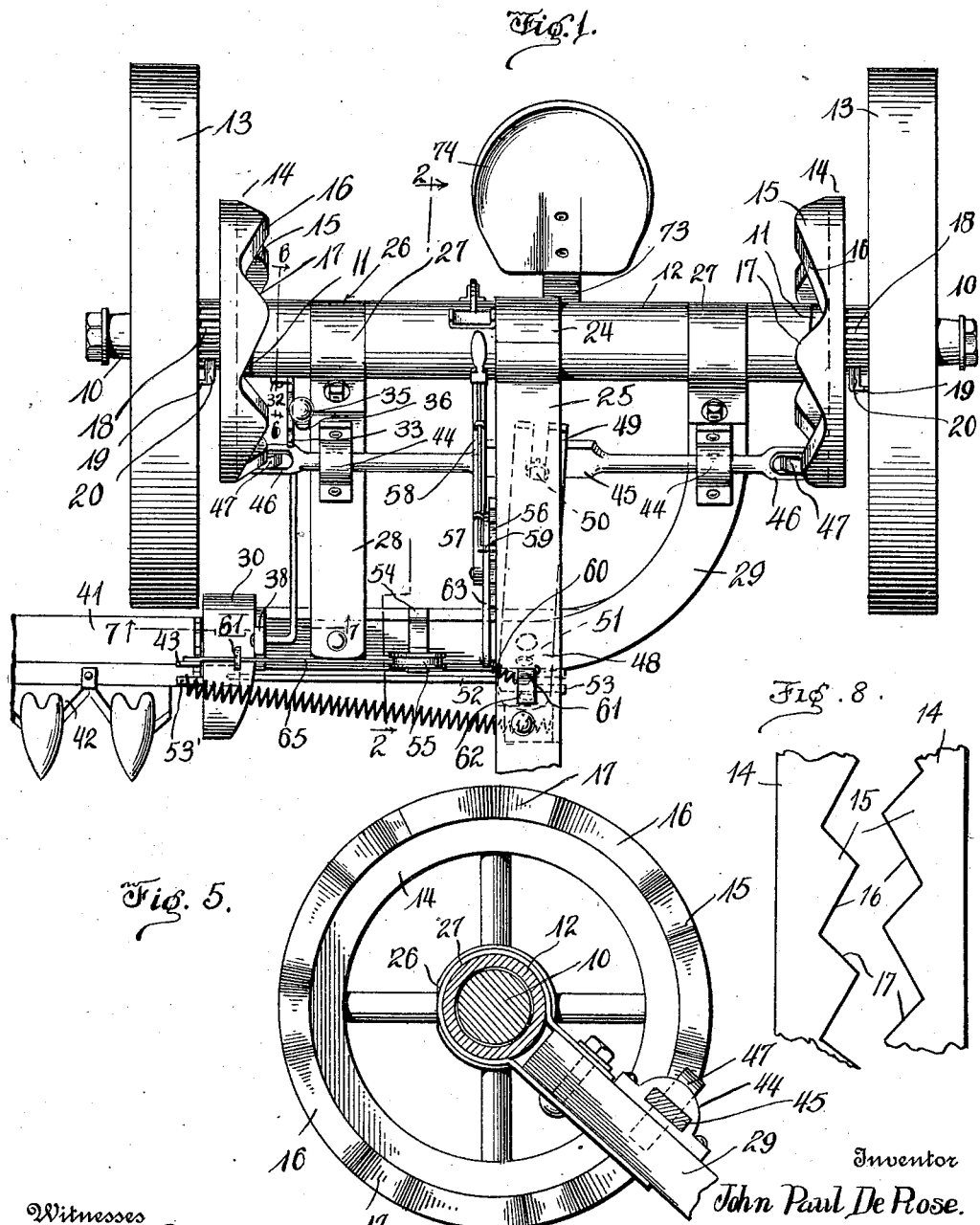
Figure 2:
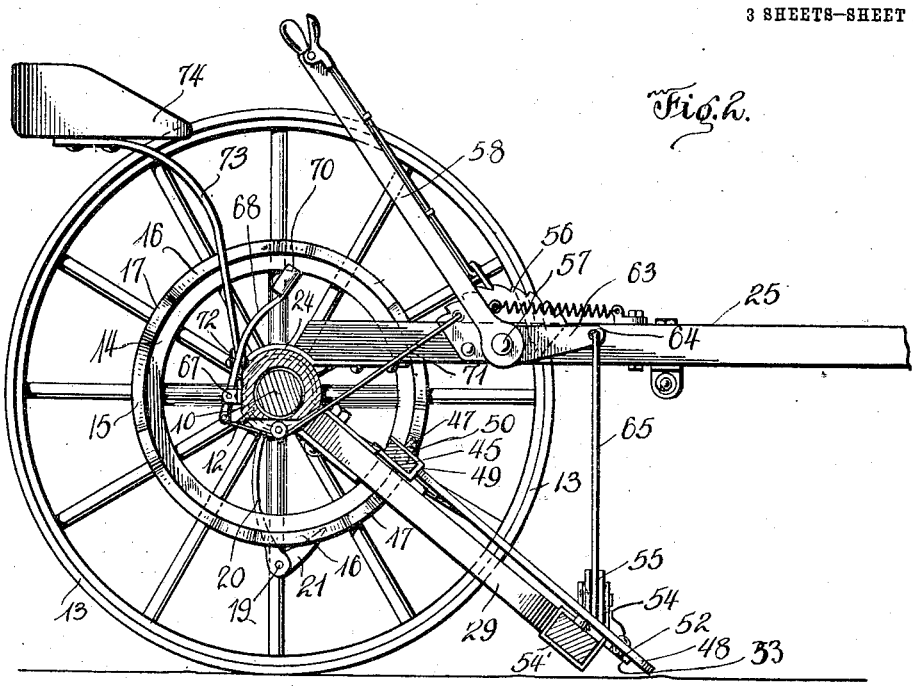
Figure 4:
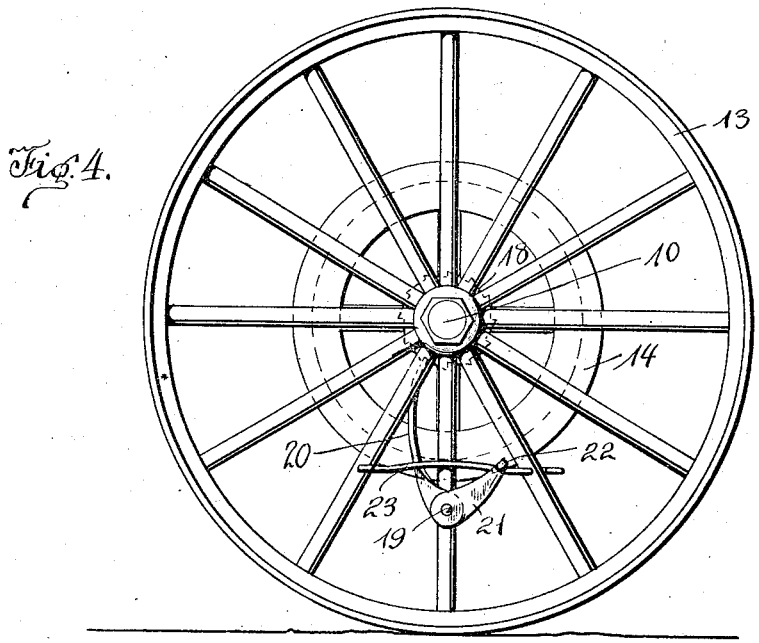

In the accompanying drawings, like characters of reference indicate like parts in the several views, and Figure 1 is a top plan view of a mower constructed in accordance with this invention, a portion of the tongue and of the sickle bar being broken away in order to show the remainder of the parts on a large scale. Fig. 2 is a section on the line 2—2 of Fig. 1. Fig. 3 is a front elevation, certain of the parts being omitted the better to show the construction. Fig. 4 is a detail showing the locking ratchet mechanism. Fig. 5 is a detail showing the method of attaching the frame to the axle sleeve. Fig. 6 is a partial section on the line 6—6 of Fig. 1. Fig. 7 is a partial section on the line 7—7 of Fig. 1.

The numeral 10 indicates the axle of a machine and centrally disposed on this axle between collars 11 is a sleeve 12 which is freely rotatable on said axle. Upon the outer ends of this axle are ground wheels 13 and between each of these ground wheels and the adjacent collar 11 is a cam wheel 14 which is securely keyed to the axle and which is provided with a series of substantially triangular cam blocks 15 which project inward from the periphery of each of the wheels 14. Each of these cam blocks is provided with a longer face 16 forming a gradual slope and this face is disposed forwardly of the cam block, that is to say, in the direction of movement of said block. The rearward face of the cam block is shorter and more abrupt as indicated at 17, and the two faces 16 and 17 lie in planes at right angles to each other. The cam wheels 14 are so located or keyed upon the axle 10 that the apex of each of the blocks 14 of one wheel lies opposite the space between two adjacent blocks of the opposite wheel. In order to drive these cam wheels 14 when the device is drawn forward and it is desired to operate the same, certain clutch mechanism is provided to engage these cam wheels with the ground wheels 13. To this end each of the cam wheels 14 is provided with a ratchet wheel 18 and pivotally mounted in one of the spokes of the wheel 13 is a short shaft 19 upon the inner end of which is supported a resilient pawl 20, said pawl being securely keyed or otherwise fastened to the shaft. Upon the outer end of each of the shafts 19 is a lever arm 21 provided with a handle portion 22 and this lever arm is likewise secured to the shaft so that as the arm is moved the pawl is also caused to move. In order to hold the lever arm locked in position either to hold the pawl 20 in contact with or free from the ratchet 18 there is provided a resilient bar 23 one end of which is fastened securely to one of the spokes of the wheel 13 while the opposite end of this bar is slidably secured in another one of the spokes of said wheel, the two spokes preferably being those which lie adjacent the spoke wherein the shaft 19 is mounted. This bar 23 is bowed inward in the middle so that considerable effort is required to move the lever arm 21 from one side to the other of the bowed portion, and the bow is so located with reference to this lever arm that when the arm lies upon one side of the bow the pawl 20 will be locked in engagement with the ratchet 18, while when the arm lies upon the opposite side of the bow the pawl 20 will be held free from said ratchet.

Fixedly attached to the center of the sleeve 12 is a bracket 24 whereon is rigidly secured a tongue 25. The sleeve 12 is further provided with reduced portions 26 evenly spaced from each side of the bracket 24 and in these reduced portions are held collars 27 which rotate freely around the sleeve. Secured to the right hand collar 27 is a forwardly and downwardly extending frame member 28 while to the left hand collar 27 is secured a frame member 29 which consists of a curved bar extending from the left hand collar and provided with a tangent portion attached to the frame member 28, said tangent portion being parallel with the axle 10. The frame as thus constructed consists of but two members while at the same time, owing to the peculiar manner of constructing this frame, it retains all the rigidity and strength of a more complicated structure. Upon the outer end of this frame member is mounted a rocker 30, the frame member being provided with a journal portion 31 for the support of this rocker.

Upon the sleeve 12 is mounted a bracket 32 whereon is carried a quadrant 33 and through the center of this quadrant and securely fixed to the bracket extends a stub shaft 34 upon which is mounted a lever 35 provided with a latch 36 so arranged as to engage the quadrant 33. This lever is pivoted intermediate its ends and to the lower end of the lever is attached a reach rod 37 which is connected to an arm 38 extending upward from the rocker 30. By means of this construction the rocker may be rotated on the journal 31 and held in adjusted position by the latch 36 of the lever 35.

Extending downward from the rocker 30 are spaced ears 39 between which is pivotally mounted a shoe 40 which supports a cutter bar 41 provided with the usual knife bar 42 slidably mounted on said cutter bar. In order to actuate the knife bar this knife bar is provided with an upstanding lug 43. Upon the frame members 28 and 29 are mounted a pair of bearings 44 through which extends a cam rod 45 provided with forked ends 46 wherein are held rollers 47 which bear against the cam blocks 15. Pivoted on the frame member 29 is an oscillating lever 48 provided with a slotted forked end 49, and a pin 50 passes through the cam bar 45 and is held in the slots of the forked end 49. Through the opposite end of this lever 48 extend a plurality of spaced perforations 51 and connecting the lug 43 with this lever 48 is an oscillating bar 52 provided with a perforated forked end 53, a pin 54 passing through the forked end and through one of the perforations 51. Now, as the wheels 14 are rotated by the pawl on the ground wheels engaging the ratchets of these wheels 14 the cam bar 45 will be oscillated to and fro by the action of the surfaces 16 of the cam blocks 15. As was previously noted these surfaces 16 are relatively long when compared with the surfaces 17 and by reason of this construction the cam bar moves freely up the surfaces 16, the shorter and more abrupt surface 17 on the opposite side practically freeing the opposite end from engagement and preventing the binding of the cam bar between the two cam surfaces. This oscillation of the cam bar 45 actuates the oscillating lever 48 and this in turn operates through the oscillating bar 52, the knife bar 42. It is to be observed that by reason of the spaced apertures 51 the inner end of the oscillating bar may be positioned farther from or nearer to the pivot point of the oscillating lever 48 and the stroke of the knife bar thus regulated. Further, the joint between the lug 43 and the oscillating bar 52 is a universal joint so that the angular movement of the lever will not cause binding at this joint.

In order to elevate the cutter bar this cutter bar is provided with an upstanding lug 53', and on the frame member 29 is mounted a sleeve 54' wherein is supported a pulley 55. Upon the tongue 25 is mounted a quadrant 56 and through the center of this quadrant passes a stub shaft 57 whereon is mounted a lever 58. This lever 58 is pivoted intermediate its ends and is provided with the usual latch 59 adapted to coact with the quadrant 56. Furthermore, the lever 58 has secured to the lower end thereof a spring 60, the free end of which is secured to an adjusting bolt 61 which passes through a bracket 62 mounted on the tongue 25. By means of this bolt 61 the tension of the spring 60 may be regulated as desired. Upon the lever 58 is secured a forwardly extending arm 63 provided with a perforation 64 in the forward end thereof and from this perforation extends a flexible strand 65 which runs under the pulley or sheave 55 and through a guide 66 on the rocker 30 and is connected to the upstanding lug 53 so that as the lever 58 is moved rearward the arm 63 is raised and acts to pull upon the spring 65 and raise the outer or free end of the sickle bar. This action is assisted by means of the spring 60 which may be termed a balance spring, inasmuch as it takes a portion of the weight of the sickle bar. This spring further prevents the sickle bar from being dropped violently on the ground with consequent injury thereto. In order to assist the action of the lever 58 there is mounted on the sleeve 12 a bracket 67 whereto is pivotally secured a foot lever 68 provided with a treadle 70, and this foot lever is pivoted intermediate its ends and has the rear end thereof connected to the lever 58 above the pivot point by means of a flexible strand 71. Now, in the operation of raising the sickle bar the driver places his foot upon the treadle 70 and grasps, at the same time, the handle of the lever 58. As he pulls rearward upon this handle he throws his weight at the same time on the treadle 70. He thus obtains a double purchase on the lever and uses his weight as well as his strength to lift the sickle bar. By means of this arrangement a long and heavy sickle bar may be used without rendering it necessary to use great strength in raising the same. The sleeve 12 has further mounted thereon a bracket 72 to which is secured a standard 73 provided with the usual seat 74.

In the operation of the device the sickle bar is held in raised position until the field which is to be mowed is reached. The operator then grasps the lever 58 and lowers the bar to operative position, after which he adjusts the lever 35 to insure the proper height of cut in the manner common to mowers by tilting the rocker 30, thus raising or depressing the forward edge of the sickle bar. The levers 21 are then moved to throw the pawls 20 into engagement with the ratchets 18 and the machine driven through the field. As the machine passes along the ground wheels cause the cam wheels to rotate and this actuates the cam bar 45 in the manner previously described. In turning a corner the resiliency of the pawls 20 permits one of these pawls to spring over the teeth of the ratchet wheel with which it engages so that one ground wheel may be backed and the corner thus made sharp in order that practically no hand mowing will be made necessary. When the field is finished the sickle bar is raised in the manner previously described and the pawls released from the ratchets. The machine may then be driven from place to place without operating the knife bar.

There has thus been provided a mower of the class described, which is absolutely free from all gearing as hereinbefore set forth.

It is obvious that minor changes may be made in the form and construction of this invention without departing from the material principles thereof. It is not therefore desired to confine the invention to the exact form herein shown and described, but it is wished to include all such as properly come within the scope of the appended claims.

Having thus described the invention, what is claimed as new, is:—

1. In a mower, an axle, ground wheels supporting said axle and freely rotatable thereon, a cam wheel adjacent one of said ground wheels, a ratchet connected to said cam wheel, a pawl supported on the adjacent ground wheel, and means supported on the ground wheel for holding said pawl in adjusted operative relation to the ratchet; in combination with a cutter mechanism, and means operatively connecting the cam wheel and the cutter mechanism.

2. In a mower, an axle, ground wheels supporting said axle and freely rotatable thereon, a cam wheel adjacent one of said ground wheels, a ratchet connected to said cam wheel, a shaft extending through one of the spokes of said ground wheel, a pawl fixed upon the inner end of the shaft, and means on the opposite side of the shaft for holding said pawl in adjusted operative relation with the ratchet; in combination with a cutter mechanism, and means operatively connecting the cam wheel and the cutter mechanism.

3. In a mower, an axle, ground wheels supporting said axle and freely rotatable thereon, a cam wheel adjacent one of said ground wheels, a ratchet connected to said cam wheel, a shaft extending through one of the spokes of said ground wheel, a pawl fixed upon the inner end of the shaft, a lever on the opposite side of the shaft for moving said pawl out of and into engagement with the ratchet, and means to releasably hold said lever in each of said positions; in combination with a cutter mechanism, and means operatively connecting the cam wheel and the cutter mechanism.

4. In a mower, an axle, ground wheels supporting said axle and freely rotatable thereon, a cam wheel adjacent one of said ground wheels, a ratchet connected to said cam wheel, a shaft extending through one of the spokes of said ground wheel, a pawl fixed upon the inner end of the shaft, a lever on the opposite end of the shaft for moving said pawl out of and into engagement with the ratchet, and means to releasably hold said lever in each of said positions, said means comprising a resilient bar mounted on said ground wheel and having a bowed portion extending across the path of said lever; in combination with a cutter mechanism, and means operatively connecting the cam wheel and the cutter mechanism.

5. In a mower, an axle, ground wheels supporting said axle and freely rotatable thereon, a cam wheel adjacent one of said ground wheels, a ratchet connected to said cam wheel, a shaft extending through one of the spokes of said ground wheel, a resilient pawl fixed upon the inner end of the shaft, a lever on the opposite end of the shaft for moving said pawl out of and into engagement with the ratchet, and means to releasably hold said lever in each of said positions; in combination with a cutter mechanism, and means operatively connecting the cam wheel and the cutter mechanism.

6. In a mower, an axle, ground wheels supporting said axle and freely rotatable thereon, a cam wheel adjacent one of said ground wheels, a ratchet connected to said cam wheel, a shaft extending through one of the spokes of said ground wheel, a resilient pawl fixed upon the inner end of the shaft, a lever on the opposite end of the shaft for moving said pawl out of and into engagement with the ratchet, and means to releasably hold said lever in each of said positions, said means comprising a resilient bar mounted on said ground wheel and having a bowed portion extending across the path of said lever; in combination with a cutter mechanism, and means operatively connecting the cam wheel and the cutter mechanism.

7. In a mowing machine, opposed cam wheels each provided with a series of cam blocks, each cam block having a gradual sloping leading face and an abrupt sloping following face, the cam face of the blocks on one wheel being staggered with relation to the cam face of the blocks on the other wheel, a cam bar mounted for longitudinal movement between said cam wheels in combination with a frame, a sickle bar supported therefrom, means on said frame to guide said cam bar, an oscillating lever mounted on the frame and operatively connected to the cam bar, a knife bar mounted on said sickle bar, and an oscillating bar connecting the oscillating lever and the knife bar.

8. In a mowing machine, opposed cam wheels each provided with a series of cam blocks, each cam block having a gradual sloping leading face and an abrupt sloping following face, the cam face on one wheel being staggered with relation to the cam face on the other wheel, and a cam bar mounted for longitudinal movement between said cam wheels, the ends of the cam bar bearing alternately against the leading surfaces of the cam blocks on the opposed cam wheels; in combination with a frame, a sickle bar supported therefrom, means on said frame to guide said cam bar, an oscillating lever mounted on the frame and operatively connected to the cam bar, a knife bar mounted on said sickle bar, and an oscillating bar connecting the oscillating lever and the knife bar.

In testimony whereof, I affix my signature, in presence of two witnesses.

JOHN PAUL DE ROSE.

Witnesses:
W. S. WADLEIGH,
C. J. HAWNBURG.

---

Copies of this patent may be obtained for five cents each, by addressing the "Commissioner of Patents, Washington, D. C."